United States Patent
Brunner et al.

(10) Patent No.: US 10,437,267 B2
(45) Date of Patent: Oct. 8, 2019

(54) PRESSURE REGULATOR DEVICE AND METHOD OF USING SAME

(71) Applicant: Krones AG, Neutraubling (DE)

(72) Inventors: Andreas Brunner, Aufhausen (DE); Thomas Hoellriegl, Teublitz (DE)

(*) Notice: Subject to any disclaimer, the term of this patent is extended or adjusted under 35 U.S.C. 154(b) by 372 days.

(21) Appl. No.: 14/940,404

(22) Filed: Nov. 13, 2015

(65) Prior Publication Data
US 2016/0139613 A1     May 19, 2016

(30) Foreign Application Priority Data

Nov. 17, 2014  (DE) .................. 10 2014 116 806

(51) Int. Cl.
*G05D 16/10*  (2006.01)
*B29C 49/78*  (2006.01)
(Continued)

(52) U.S. Cl.
CPC ........... *G05D 16/106* (2013.01); *B29C 49/36* (2013.01); *B29C 49/4289* (2013.01);
(Continued)

(58) Field of Classification Search
CPC ...... G05D 16/106; G05D 7/01; G05D 7/0106; G05D 7/0113; G05D 7/012; B29C 49/36;
(Continued)

(56) References Cited

U.S. PATENT DOCUMENTS 2,806,481 A * 9/1957 Faust .................. G05D 16/163
137/116.5
3,621,867 A * 11/1971 Johnson ............... F16K 17/085
137/484.8

(Continued)

FOREIGN PATENT DOCUMENTS

EP  0726511 A2  8/1996
EP  2848387 A1  3/2015

OTHER PUBLICATIONS

1st Office Action, with English translation,Chinese Patent Application No. 201510791849.X; dated Jun. 2, 2017; 8 pages.
(Continued)

*Primary Examiner* — Robert C Dye
*Assistant Examiner* — Sonny V Nguyen
(74) *Attorney, Agent, or Firm* — Michael J. Gallagher; Luper Neidenthal & Logan, LPA (57) ABSTRACT

A pressure regulator device, particularly a dome-loaded pressure regulator, regulating a blowing pressure in a blow-molding machine, including a regulator chamber. The regulator chamber includes a primary pressure port for introduction of primary medium into the regulator chamber with primary pressure, and a secondary pressure port for discharging primary medium from the regulator chamber with secondary pressure. A regulator piston is mounted displaceably inside the regulator chamber, movable into an open and a closed position by a switch position of a valve control device for controlling and/or setting the primary and/or secondary pressure. The valve control device includes a control chamber, and a sealing device arranged at a lower movement stop inside the control chamber between the secondary pressure port and the control means, such that contact of the primary medium with the control means is prevented at least partly, preferably completely, independently of the control pressure and/or primary pressure.

12 Claims, 5 Drawing Sheets

(51) Int. Cl.
    *B29C 49/42*    (2006.01)
    *B29C 49/36*    (2006.01)
    *G05D 16/18*    (2006.01)
    *B29C 49/06*    (2006.01)
    *B29K 105/00*   (2006.01)
    *B29L 31/00*    (2006.01)
(52) U.S. Cl.
    CPC ........... *B29C 49/783* (2013.01); *G05D 16/18*
            (2013.01); *B29C 49/06* (2013.01); *B29C
            2949/78537* (2013.01); *B29K 2105/258*
            (2013.01); *B29L 2031/712* (2013.01)
(58) Field of Classification Search
    CPC ..... G01L 7/08; G01L 7/082; Y10T 137/7836;
            F16K 7/126; F16K 7/14; F16K 7/17
    See application file for complete search history.

(56) References Cited

U.S. PATENT DOCUMENTS

| | | | | |
|---|---|---|---|---|
| 3,990,470 | A * | 11/1976 | Malec | G05D 7/0106 137/505.37 |
| 5,944,050 | A * | 8/1999 | Walker | F16K 17/085 137/115.27 |
| 2003/0052200 | A1* | 3/2003 | Ottestad | G05D 16/0638 239/569 |
| 2010/0206401 | A1* | 8/2010 | Niebel | G05D 16/10 137/505.11 |
| 2011/0309557 | A1* | 12/2011 | Martini | B29C 49/42 264/523 |
| 2012/0177770 | A1 | 7/2012 | Knott | |
| 2014/0203198 | A1* | 7/2014 | Jennings | F16K 7/17 251/61.1 |
| 2014/0358301 | A1* | 12/2014 | Muir | G05D 16/2093 700/282 |
| 2016/0202708 | A1* | 7/2016 | Hurst | G05D 7/0641 137/487.5 |
| 2016/0341330 | A1* | 11/2016 | Sneh | F16K 31/128 |

OTHER PUBLICATIONS

German Search Report, German Patent Application No. 102014116806. 2; dated Oct. 26, 2015; 49 pages.

* cited by examiner

PRESSURE REGULATOR DEVICE AND METHOD OF USING SAME

CROSS-REFERENCE TO RELATED APPLICATIONS

This application claim priority to German patent application 10 2014 116 806.2, filed Nov. 17, 2014, which is incorporated as if fully rewritten herein.

STATEMENT REGARDING FEDERALLY SPONSORED RESEARCH OR DEVELOPMENT

Not applicable.

TECHNICAL FIELD

The present disclosure relates generally to a pressure regulator device, in particular a dome-loaded pressure regulator, for regulating a blowing pressure, a device for forming plastic preforms into plastic containers, and a method for forming plastic preforms into plastic containers

SUMMARY OF THE INVENTION

The pressure regulator device described herein for regulating a blowing pressure within a blowmolding machine comprises a regulator chamber, wherein the regulator chamber comprises at least one primary pressure port for introduction of a primary medium into the regulator chamber with a primary pressure, and at least one secondary pressure port for discharging the primary medium from the regulator chamber with a secondary pressure, and wherein a regulator piston is mounted displaceably inside the regulator chamber.

In a working mode of the pressure regulator device described here, the primary medium may be a blowmolding medium, for example blowing air, wherein in a cleaning and/or sterilization mode, the primary medium may for example be a cleaning and/or sterilization medium which cleans or sterilizes the same fluid paths of the pressure regulator device through which the blowing air flows in working mode. In other words, using the pressure regulator device described above, the same fluid paths which conduct the blowing air in working mode may be at least partially, but preferably also completely, sterilized with the sterilization medium in cleaning mode.

Also the pressure regulator device described here comprises a regulator piston which can be moved into an open and a closed position, depending on a switch position of a valve control device for controlling and/or setting the primary pressure and/or secondary pressure. To this extent it is provided that the regulator piston can be moved inside the regulator chamber via pressurization of the valve control device.

Here the primary medium is conducted from the primary pressure port through the regulator chamber to the secondary pressure port only when the regulator piston is in the open position. Thus the valve control device mentioned above may be regarded as the sole control and regulation instrument, by means of which the regulator piston can be moved to and fro between the open position and the closed position.

The valve control device comprises a control chamber, wherein the control chamber in turn comprises at least one control pressure port for introduction of a control medium into the control chamber, and wherein control means which can be pressurized with compressed air are arranged inside the control chamber. The control means is actively connected to the regulator piston such that, on an increase in secondary pressure of the primary medium above a pressure level of the control pressure of the control medium, the regulator piston transfers from an open to a closed position, and conversely, on a reduction of the secondary pressure below a pressure level of the control pressure, the regulator piston transfers from a closed to an open position.

For example, the control means and the regulator piston are connected together purely mechanically via a connecting linkage. It is however also conceivable that, alternatively or additionally, the control means and the regulator piston are actively connected with each other fluidically by a pneumatic mechanism.

In other words, such an arrangement of the control means relative to the regulator piston means that a movement and/or deformation of the control means is directly accompanied by a corresponding movement of the regulator piston.

Such pressure regulator devices are however already known from the prior art. Thus for example, pressure regulator devices are known in which the control means is configured as a control piston. When a control pressure is applied in such known pressure regulator devices, the control piston for example moves down when it overcomes a force from a compression spring countering the movement of the control piston and/or regulator piston. Therefore when the control piston is moved down, the regulator piston with its seal is also moved down. As a result, a gap is created between the seal, which is preferably attached to the regulator piston, and a sealing edge of an interior of the regulator chamber, so that air pressure transfers from the primary pressure port to the secondary pressure port.

As an alternative to the embodiments with control piston, the prior art also discloses pressure regulator devices which have a membrane as a control means. While such pressure regulators with membranes known from the prior art have proved suitable for use in blowing air lines of conventional stretch-blowmolding machines, they are not unfortunately suitable for use in an aseptic stretch-blowmolding machine. The material of the membrane does not withstand the high aseptic requirements in the long term, since during at least one operating state, namely during sterilization, a sterilization agent at least partially contacts the control membrane. The sterilization agent is normally gaseous $H_2O_2$, which has some corrosive and highly oxidizing properties, and thus damages the material.

In the past therefore it was decided to use the variant known from the prior art, of a pressure regulator device with control piston, in an aseptic blowmolding machine. Because of the huge loads in the blowmolding process due to the compressed air, heat and friction however, the control piston also cannot be used for long periods in an aseptic blowmolding machine. The control properties of the valve are also not satisfactory in the piston variant.

However it has proved particularly advantageous if the entire production process, as far as the filled container for example, can be carried out completely in a sterile environment.

An object of the present invention is therefore to overcome said problems and thus produce a pressure regulator device, in particular a dome-loaded pressure regulator, for regulating a blowing pressure within a blowmolding machine, which can be operated in a particularly simple and economic manner, is highly stable in operation and also resistant to cleaning processes, in particular sterilization processes, and at the same time can be operated inside a sterile room.

This object is achieved by the subject of claim 1. Advantageous embodiments are described in the dependent claims.

In order to specify a pressure regulator device which eliminates the above problems, the present pressure regulator device utilizes amongst others the concept that at least one sealing device is arranged at a lower movement stop inside the control chamber between the secondary air port and the control means, which device at least partly, preferably completely, prevents a contact of the primary medium with the control means, independently of the control pressure and/or primary pressure. This means that irrespective of how high or low the individual pressures are selected, in no case can the membrane come into contact with the sterilization medium. Generally however it is conceivable that the control means only contact the sealing device directly in cleaning mode.

According to at least one embodiment, the pressure regulator device described here, in particular the dome-loaded pressure regulator described here for regulating a blowing pressure inside a blowmolding machine, comprises a regulator chamber, wherein the regulator chamber comprises at least one primary pressure port for introduction of a primary medium into the regulator chamber with a primary pressure, and at least one secondary pressure port for discharging the primary medium from the regulator chamber with a secondary pressure, wherein a regulator piston is mounted displaceably inside the regulator chamber.

Here the regulator piston can be moved into an open and a closed position depending on a switch position of a valve control device for controlling and/or setting the primary pressure and/or secondary pressure, wherein the primary medium is conducted from the primary pressure port through the regulator chamber to the secondary pressure port only when the regulator piston is in the open position.

Also, the pressure regulator device described here comprises a valve control device which in turn comprises a control chamber, wherein the control chamber comprises at least one control pressure port for introduction of a control medium into the control chamber, and control means which can be pressurized with compressed air are arranged inside the control chamber, wherein the control means is actively connected to the regulator piston such that, on an increase in the control secondary pressure of the primary medium above a pressure level of the control pressure of the control medium, the regulator piston transfers from an open to a closed position, and conversely, on a reduction of the secondary pressure below a pressure level of the control pressure, the regulator piston transfers from a closed to an open position.

According to the invention, at least one sealing device is arranged at a lower movement stop inside the control chamber between the secondary pressure port and the control means, which device at least partly, preferably completely, prevents a contact of the primary medium with the control means, independently of the control pressure and/or primary pressure.

According to at least one embodiment, the pressurizable control means is configured in the form of a control pressure membrane which divides the control chamber into two pressure chambers and separates these fluidically from each other. In other words, the control chamber can therefore be divided into an upper pressure chamber facing away from the regulator chamber, and a lower pressure chamber facing towards the regulator chamber.

To this extent, the invention makes use of the knowledge that to simplify switching processes, for example a control membrane be used as a control means, and secondly the control membrane can be used since, in contrast to the system described in the prior art, the sealing device described here ensures adequate protection against corrosive and/or oxidizing properties of the sterilization medium.

It is conceivable that then, on its side facing the lower pressure chamber, the control pressure membrane is provided with a membrane disc, and on its side facing the upper pressure chamber, it is surrounded by a plate in the lateral direction. The "lateral direction" is therefore a direction parallel to a main extension direction of the control pressure membrane. If namely in cleaning mode, sterilization medium—for example hydrogen peroxide or another oxidizing or sterilizing medium—is conducted through the regulator chamber, the control pressure is selected relative to the primary pressure such that the control pressure membrane hits on the lower movement stop inside the control chamber.

Therefore a seal, e.g. a flat seal, is let into the lower movement stop as a possible embodiment of the sealing device described above, wherein the seal in turn preferably extends in the lateral direction. To this extent, the seal is arranged between the sterilization medium and the control pressure membrane, so the control pressure membrane cannot come into contact with the hydrogen peroxide, i.e. the sterilization medium. The control pressure membrane is therefore protected from chemical attack from the sterilization medium. Such a system of control and influencing of the control pressure membrane can be achieved in that the lower pressure chamber is fluidically connected to the secondary chamber via at least one channel. When blowing air and/or sterilization medium flows out of the regulator chamber, this is automatically conducted via a line system in the direction of the lower pressure chamber, and therefore—if no seal is present—introduced into the lower pressure chamber and then supplied from the lower pressure chamber via a channel to the secondary pressure port. The sealing device in the lower movement stop described here however covers the control pressure membrane, so that at the lower movement stop, the sterilization medium cannot come into contact with the control pressure membrane.

Therefore, insofar as the control pressure membrane makes contact in the direction of or on the lower movement stop, a gas-tight connection is achieved between the control pressure membrane and the lower movement stop by the seal device.

According to at least one embodiment, in at least one operating state, the primary medium is blowing air for expanding plastic preforms into plastic containers during a working mode. To this extent, the pressure regulator device described here can be installed in a sterile stretch-blowmolding device, so that it is possible to switch between a working mode and a cleaning mode particularly simply via a valve control system. It has been found that the sealing device described here, although arranged as an additional sealing element on the lower movement stop inside the control chamber, has no negative effects with regard to the control and regulation properties described above. It was therefore found that the regulation precision and operating stability can be increased tremendously despite the additional installation of a further element, i.e. the sealing device described herein.

According to at least one embodiment, in at least one further operating state, the primary medium is a gaseous sterilization medium which, in a cleaning mode, is conducted from the primary pressure port through the regulator chamber and out of the regulator chamber again via the secondary pressure port. As already mentioned above, therefore preferably sterilization medium flows through the same paths as the blowing medium in working mode.

According to at least one embodiment, during cleaning mode, the primary pressure is less than or equal to the control pressure. This ensures that for example, during cleaning mode, the control pressure membrane described above is always pressed on the lower movement stop inside the control chamber and thus always in direct contact with the sealing device, for example a flat seal, so that at no time during cleaning mode can the sterilization medium come into direct contact with the control means, i.e. for example the control pressure membrane.

According to at least one embodiment, a pressure plate is arranged at the regulator piston, wherein the pressure plate comprises a plate seal and, in the closed position of the regulator piston, the plate seal closes the regulator chamber fluid-tight against the secondary pressure port. To this extent, the plate seal can preferably completely surround the pressure plate in the radial direction, i.e. along its edge. In a closed position therefore, the plate seal, which is arranged on the pressure plate or is part of the pressure plate, is in fluid-tight contact with an inner sealing segment, for example a protruding edge inside the regulator piston. No blowing air in working mode, nor sterilization medium in cleaning mode, can penetrate therefore between the inner sealing segment inside the regulator piston and the pressure plate.

According to at least one embodiment, the plate seal is attached releasably to the pressure plate and/or the regulator piston with a sealing collar which can be detached from the pressure plate and/or the regulator piston.

Previously, the plate seal was arranged at the regulator piston between the pressure plate and a protruding sealing edge of the regulator piston. This however entails the disadvantage that, due to the clamping of the seal between the pressure plate and the sealing edge of the regulator piston, the seal can only be separated from the regulator piston by the user with difficulty, since the sealing edge is itself an inseparable part of the regulator piston and makes intervention in the plate seal for extraction and release extremely difficult. This sometimes meant that the seal could only be re-introduced between the protruding sealing edge of the regulator piston and the pressure plate in a highly time-consuming process. As a consequence, it was found that to save time, in the case of leaks and structural damage to the plate seal, instead of merely replacing this, the entire regulator piston including pressure plate often had to be replaced. Evidently this led to particularly high repair costs. A system has now been developed which, in a particularly simple, economic and in particular time-saving manner, simplifies the process of separating the plate seal from the regulator piston in order to replace only the actual seal, without having to use a new regulator piston.

For this, the one-piece design of the sealing edge with the rest of the regulator piston was rejected, and the sealing edge accommodated in a separate component which can be detached from the rest of the regulator piston. This separate component therefore is the abovementioned sealing collar, preferably made integrally, which surrounds the sealing edge. In mounted state, the sealing edge preferably presses the plate seal from above onto the regulator piston. Also the sealing collar clamps the plate seal in the lateral direction, i.e. at the sides. The plate seal can thus neither slip upward nor move to the side.

If the plate seal develops a fault, first the regulator piston can be removed from the regulator chamber and in a further step, only the sealing collar need be removed from the rest of the regulator piston. After removal of the sealing collar therefore, the seal is exposed such that it can be removed from the pressure plate, for example even without tools. After removal, then a new seal can be clamped in or onto the seal plate, and in a further step the sealing collar can be releasably re-attached, for example from above, onto the seal. After re-attachment therefore the sealing collar with its protruding edge fixes the seal again onto the regulator piston.

According to at least one embodiment, the sealing collar is configured in the form of a union nut. It has namely been found that forming the sealing collar as a union nut is perfectly adequate with regard to the pressure and sealing properties. For example, the union nut may then easily be placed from above onto the plate seal at the edge, for example screwed on, so that after fixing, the sealing edge of the union nut presses the seal onto the regulator piston and the seal is thus firmly clamped between the pressure plate and the union nut.

According to at least one embodiment, the plate seal is configured in the form of a sealing washer or an O-ring. As already mentioned above, the sealing washer can then completely surround the pressure plate in the plate peripheral direction, and is therefore configured as an edge segment in top view. Alternatively however the seal, instead of having a flat configuration i.e. as an edge segment, can also take the form of the O-ring described above. Instead of being formed as an edge segment therefore, the seal has an annular configuration in top view.

Furthermore, the application concerns both a device for forming plastic preforms into plastic containers and a corresponding method for forming plastic preforms into plastic containers, i.e. the same features are applied to the device described here and to the method described here as were disclosed in connection with the pressure regulator device described above, and vice versa.

According to at least one embodiment, the device described herein comprises a movable carrier, on which a plurality of forming stations is arranged for forming the plastic preforms into plastic containers, wherein at least one pressure regulator device is arranged and this pressure regulator device is configured and provided for pressurizing the plastic preforms with a blowing pressure of a primary medium in order to expand the plastic preforms into plastic containers.

WO 2010/020529 A2 discloses a sterile blowmolding machine. The subject of this publication is hereby included in full by reference in the subject of the present application. In particular, this publication shows that the blowmolding machine is arranged in a clean room.

The clean room may have an atmosphere which contains fewer germs, contaminants, bacteria or spores than the atmosphere outside the clean room. In particular, for this an air filter may be arranged on the device, through which (for example by means of a fan) filtered air is introduced into the clean room. In particular, the air introduced may be substantially sterile air. In particular, the clean room is kept at a slight positive pressure relative to the atmosphere outside the clean room. The pressure difference may for example lie in a range from 0.1 mbar to 400 mbar. In particular, the clean room may have seals which seal the clean room from the outer atmosphere, at least in regions. The seals may be seals of elastic material or hydraulic seals, such as water locks. The seals may preferably be configured circular along the periphery of the rotating carrier. Furthermore, the clean room and/or parts of the forming stations located in the clean room may be cleaned and/or sterilized at specific, in particular regular, time intervals. Preferably, cleaning takes place first with foam, then with sterile water to remove the foam. Sterilization may be carried out with gaseous hydrogen peroxide. The means for introducing the cleaning and sterilization media may be nozzles arranged stationarily or rotating with the carrier. Also, sterilization medium may emerge from blowing nozzles of the forming stations. Said means for preparing the clean room, or combinations thereof, may be used depending on the requirements for hygiene, cleanliness or stability of the machine or the plastic containers produced therewith.

In particular, the device claimed here for forming plastic containers comprises a heating apparatus, wherein this heating apparatus is arranged upstream of the abovementioned device in a transport direction of the plastic preforms. This heating apparatus serves to heat the preforms so that these can then be expanded into containers in a blowmolding process. A filler device is provided downstream of or after the forming device, which fills the containers with a beverage, in particular with an aseptic product.

This filler device is here arranged in a clean room. Also, preferably, the clean room extends up to the region of a closing device which closes the containers with a closure.

Furthermore, the plant preferably has a sterilization apparatus which sterilizes at least a region of the plastic preforms before reaching the device. The sterilization may be carried out with a gaseous medium, such as in particular hydrogen peroxide. It would however also be possible for sterilization to take place using radiation, such as for example electron beam and/or UV light. Preferably, a sterilization apparatus is provided which in particular also sterilizes the inner surface of the plastic preforms. In addition however, the outer surface of the plastic preforms may also be sterilized.

In a further advantageous embodiment, the device has a further clean room which is arranged upstream of the abovementioned device in the transport direction of the plastic preforms. Preferably, this further clean room transforms into the clean room of the forming device. In this way, it is possible to transport the plastic containers continuously from their sterilization until their closure, and at the same time keep the clean rooms required for this relatively small. Thus, preferably, the clean room is provided as a channel extending from the sterilization device to the closure device, and particularly preferably adapted to the corresponding blowmolding stations or holding devices such as gripper elements for the preforms or plastic containers. In particular, it is conceivable that the pressure regulator device described herein is arranged in at least one of the abovementioned clean rooms.

Here the device described above has the same advantageous embodiments and advantages as explained in connection with the pressure regulator device described above.

According to at least one embodiment, the method described here for forming plastic preforms into plastic containers again comprises a movable carrier, on which a plurality of forming stations is arranged for forming the plastic preforms into plastic containers, wherein at least one pressure regulator device—as described above according to at least one embodiment—is used to pressurize the plastic preforms with a blowing pressure of a primary medium in order to expand the plastic preforms into plastic containers. The method described here comprises at least two operating modes. The working mode during which the plastic preforms are inflated forms a first operating mode. A cleaning mode, during which the blowers are only cleaned and/or their fluid paths sterilized, forms a second operating mode.

Illustrative examples of various embodiments of the invention, all provided by way of example and not limitation, are described.

BRIEF DESCRIPTION OF THE ILLUSTRATIONS

Without limiting the scope of the as disclosed herein and referring now to the drawings and figures.

These illustrations are provided to assist in the understanding of the exemplary embodiments of the method of forming a moldable splint and materials related thereto described in more detail below and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

Figure 1A:
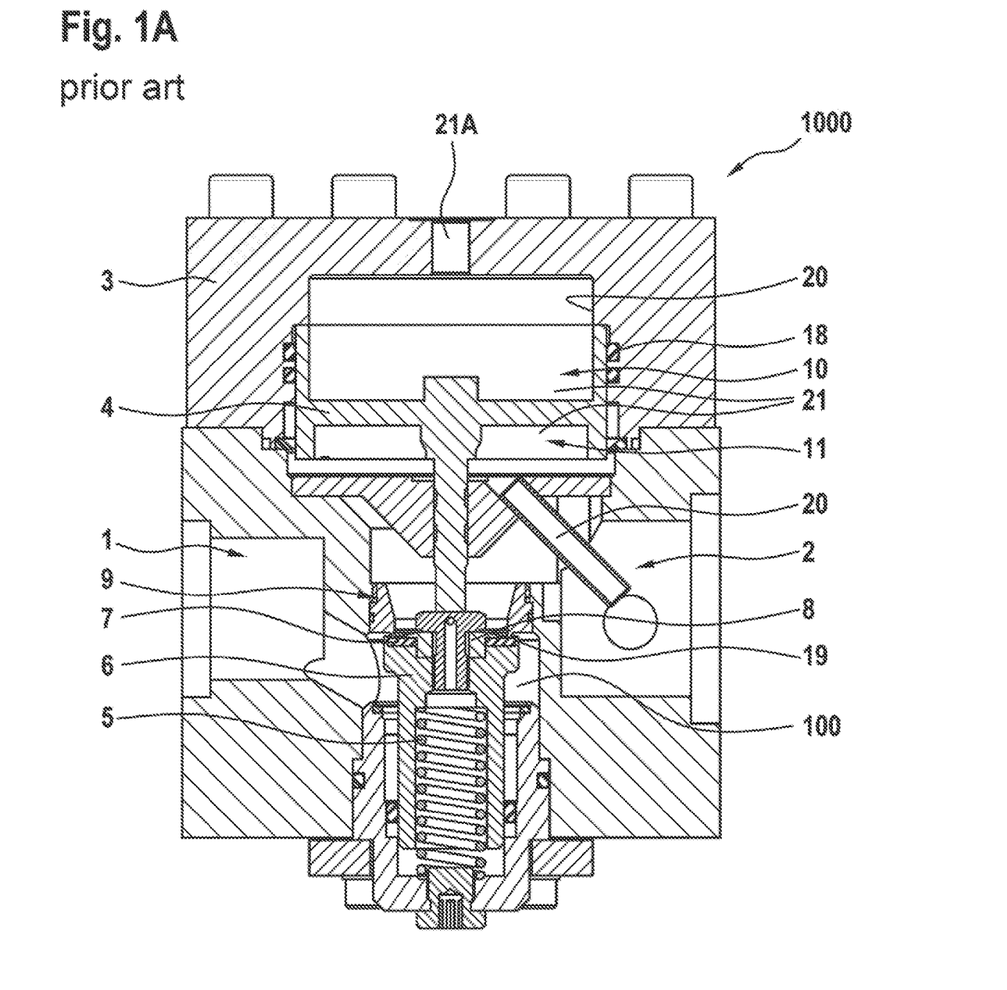
FIG. 1A is a cross-sectional view of a pressure regulator device known from the prior art.
Figure 1B:
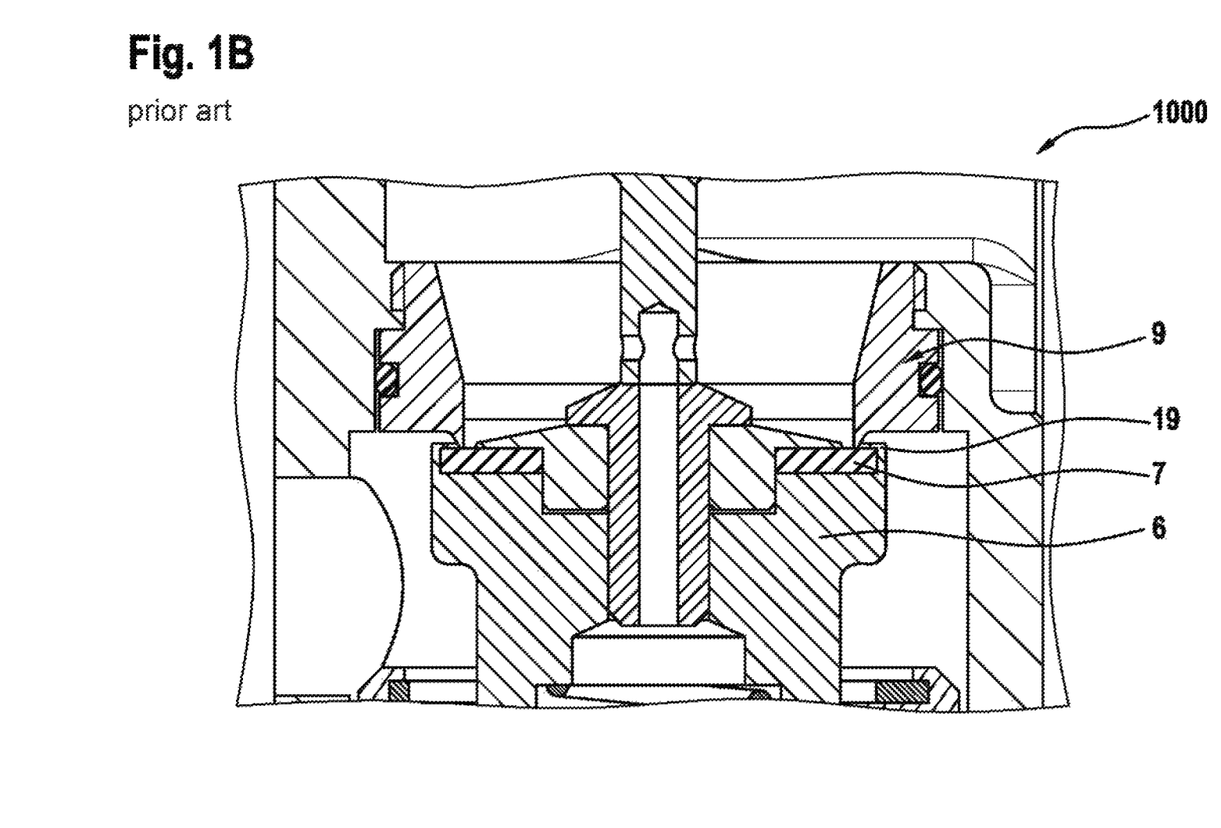
FIG. 1B a cross-sectional view of a detail of a pressure regulator device known from the prior art.
Figure 2:
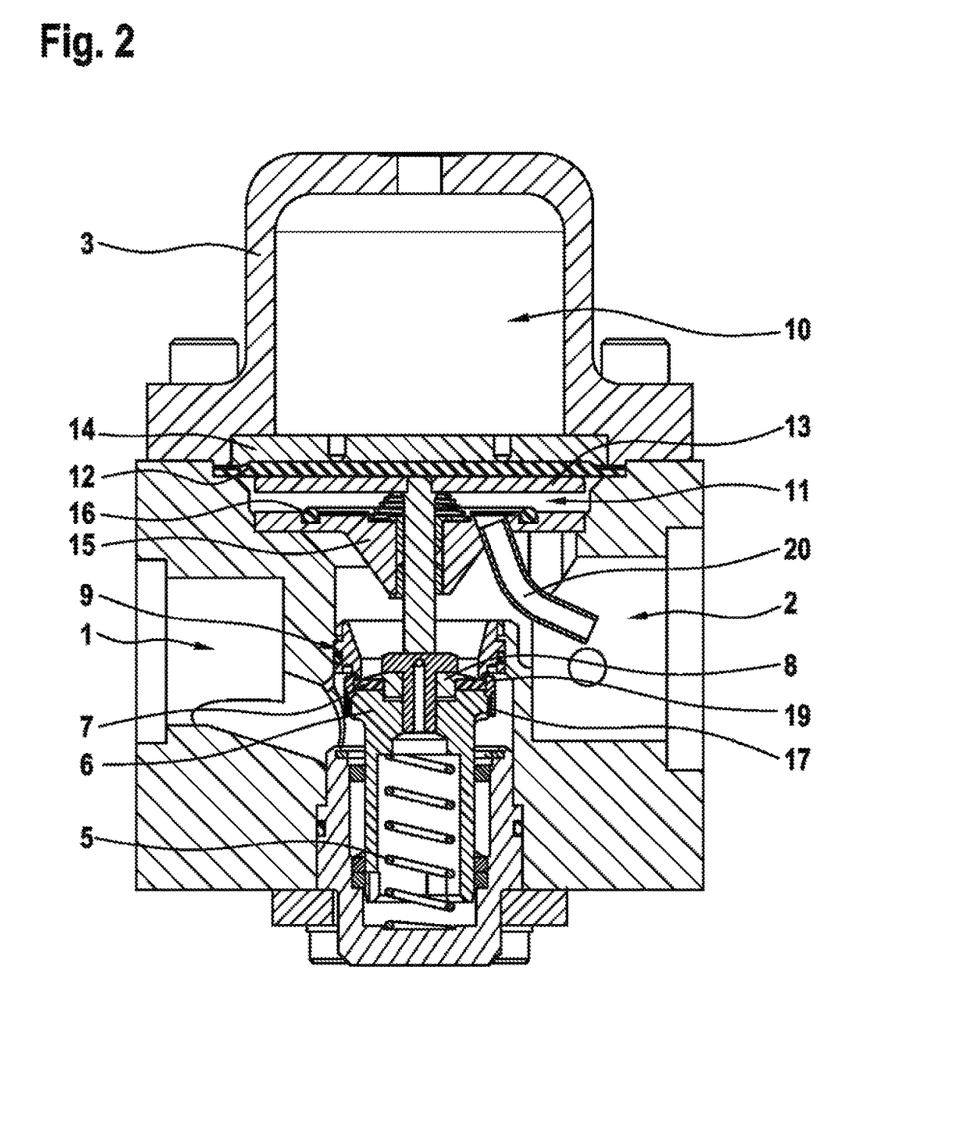
FIG. 2 is a cross-sectional view of an embodiment of a pressure regulator device.
Figure 3:
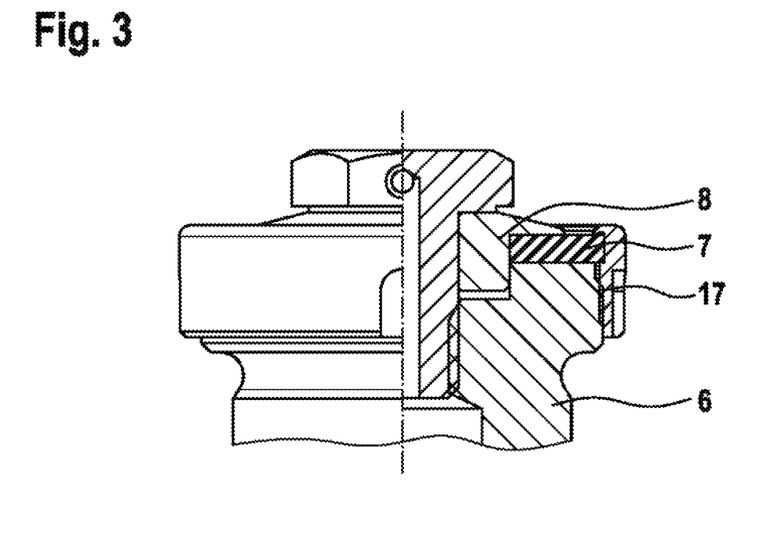
FIG. 3 is a cross-sectional view of a detail of an embodiment of a pressure regulator device.
Figure 4:
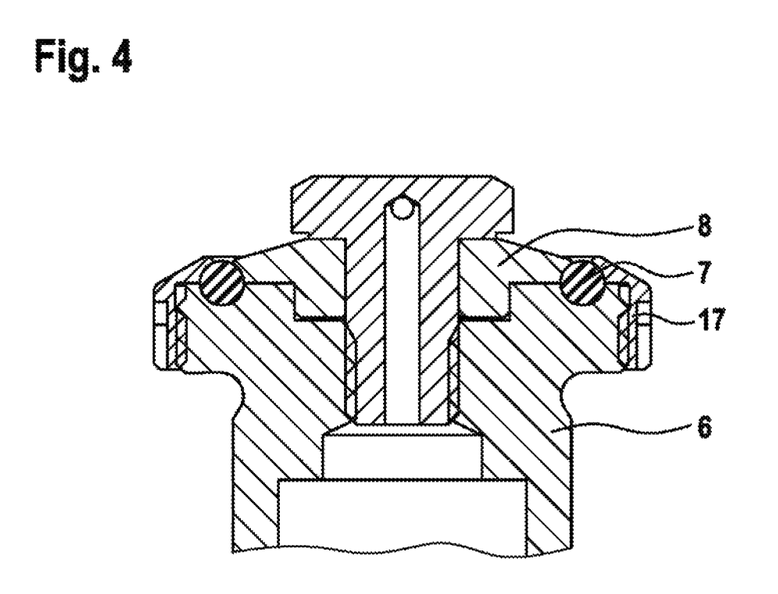
FIG. 4 is a cross-sectional view of a detail of an embodiment of a pressure regulator device.
Figure 5:
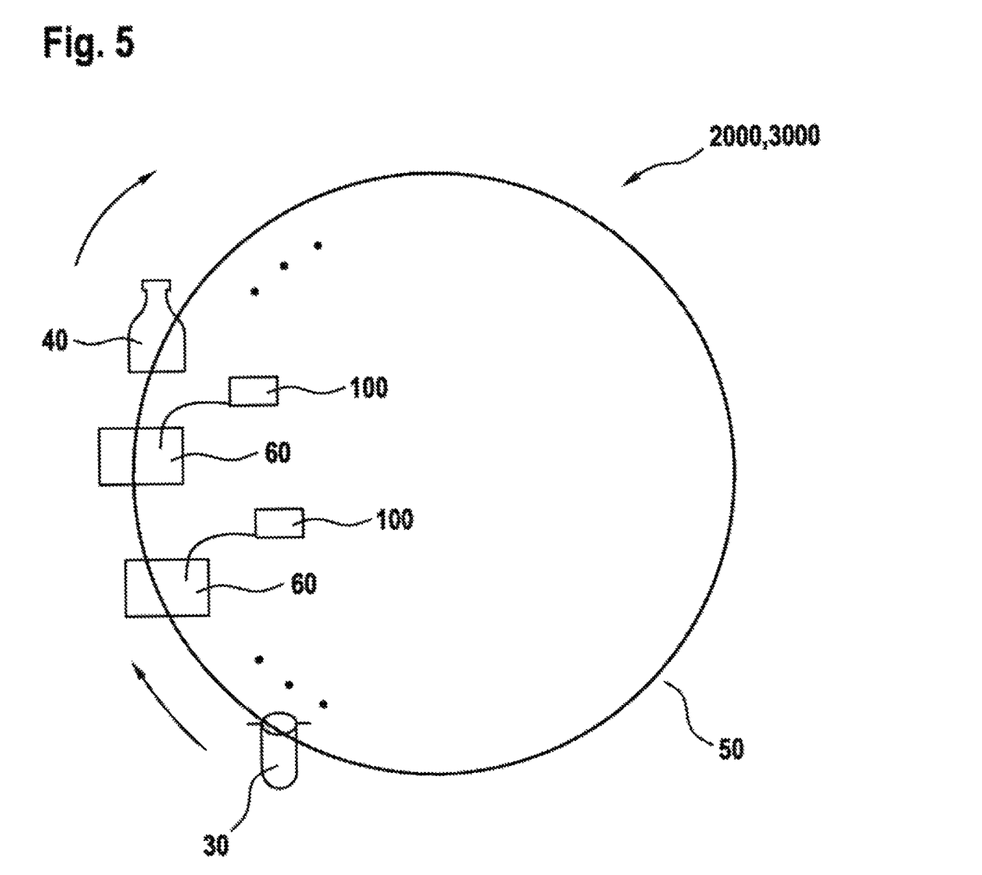
FIG. 5 is a diagrammatic top view, of an exemplary embodiment of a device for forming plastic preforms into plastic containers.

The invention is described below in more detail with reference to FIGS. 1-5. FIGS. 1A and 1B depict a construction principle, known from the prior art, of a pressure regulator device, in particular the dome-loaded pressure regulator, while FIGS. 2 to 4 show exemplary embodiments of the pressure regulator device described herein. FIG. 5 shows, in a diagrammatic top view, an exemplary embodiment of a device for forming plastic preforms into plastic containers.

In the exemplary embodiments and in the figures, the same or equivalent components carry the same reference numerals. The elements depicted here should not be regarded as to scale, rather individual elements have been shown excessively large for clearer understanding.

FIG. 1A shows, in a diagrammatic section view, an exemplary embodiment of the dome-loaded pressure regulator 1000 already known from the prior art. In particular, the dome-loaded pressure regulator 1000 shown in FIG. 1A is described in its closed position.

In the pressure regulator device 1000, it is clear that this comprises a regulator chamber 100, wherein the regulator chamber 100 has a primary pressure port 1 for introduction of a primary medium into the regulator chamber 100 at a primary pressure, and a secondary pressure port 2 for discharge of the primary medium from the regulator chamber 100 at a secondary pressure, and a regulator piston 6 is mounted movably inside the regulator chamber 100. In other words, the regulator piston 6 can move to and fro in a stroke direction inside the regulator chamber.

Depending on a switch position of a valve control device 20 for controlling and setting the primary pressure and/or secondary pressure, the regulator piston 6 is described in a closed position shown in FIG. 1A.

As can be seen particularly clearly from FIG. 1A, in the upper region i.e. in the upper pressure chamber 10 of a control chamber 21, a port is provided for a control pressure. The upper pressure chamber 10 is often described as a cupola (dome). The pressure predominating in the upper pressure chamber 10 presses a control piston, in the form of a control means 4, in the direction of the regulator chamber 100, i.e. in the downward direction away from the upper pressure chamber 10. The control means 4 has seals 18 on the edge in order to separate the upper pressure chamber 10 (control pressure) from a lower pressure chamber 11.

A force (spring force) of a compression spring 5 also acts against the pressure acting on the control means 4. Above the compression spring 5, a regulator piston 6 is arranged which is sealed on the outside in the lower region. In rest state, i.e. a state in which no control pressure acts from above on the control means in the direction of the regulator piston 6, the pressure regulator device 1000 is closed (regulator piston 6 in upper end position).

The closure of the pressure regulator device 1000 is achieved via a plate seal 7 which is arranged at the top in the regulator piston 6. In other words, therefore, in the inner region the plate seal 7 is fixed to the regulator piston 6 by a pressure plate 8 of the regulator piston, and in the outer region by a protruding edge 19 of the regulator piston. The regulator piston 6 is pressed up by the compression spring 5 and the secondary pressure. In the region between the protruding edge 19 and the fixed pressure plate 8, a sealing edge with a protruding lip 9 is pressed onto the seal (see also FIG. 1B).

If now a control pressure is applied, the control means 4, i.e. the control piston, moves down when the force of the compression spring 5 is overcome. When the control means 4 is moved down, the regulator piston 6 with the plate seal 7 also moves down. A gap is created between the plate seal 7 and the sealing edge 9, so that now an air pressure can transfer from the primary pressure port 1 to the secondary pressure port 2.

In the present exemplary embodiment according to the prior art, therefore the control means 4 in the form of a control piston 4 is configured as a double T-shape (in cross-section) in the upper pressure chamber 10, so that the control pressure predominates in the upper pressure chamber 10. The second pressure chamber 11 is connected to the secondary pressure port 2 via a channel 20. Thus the secondary pressure present at the secondary pressure port 2 counters the control pressure. If the upper pressure chamber 10 is pressurized with the control pressure, the control and regulator piston 6 is pressed down, wherein compressed air flows from the primary pressure port 1 to the secondary pressure port 2. The secondary pressure flows through the channel 20 also into the lower pressure chamber 11. When the control pressure and secondary pressure in the lower pressure chamber 11 balance out, the control means 4 and the regulator piston 6 move up and the air flow is reduced or interrupted. This condition persists until the secondary pressure is lower than the control pressure. In this case, the control means 4 is pressed down again and pressure can again transfer from the primary pressure port 1 to the secondary pressure port 2.

Such pressure regulator devices 1000 may be operated for example with a primary pressure of at least 35 bar up to maximum 45 bar, preferably at least 38 bar up to maximum 42 bar, for example 40 bar, wherein for a secondary pressure the range is from at least 0.5 bar up to maximum 38 bar. With regard to operating temperature, the range may be between 10° C. and 40° C. These physical parameters therefore correspond to parameters which are applied in working mode.

A cleaning and/or sterilization mode is an operating mode in which the primary pressure lies in a range from at least 1 bar to maximum 3 bar, for example 2 bar, wherein a secondary pressure is at least 1 bar and maximum 3 bar, for example 2 bar, and the control pressure is at least 1 bar and maximum 5 bar, for example 3 bar, and simultaneously the operating temperature is selected in a range from at least 100° C. to maximum 140° C., for example 120° C. The sterilization medium may be compressed air in which a sterilization medium, for example hydrogen peroxide, has been mixed.

According to the exemplary embodiment of the invention, now corresponding to FIG. 2, the control piston 4 described above is replaced by a control pressure membrane, wherein the principles of structure and function remain the same.

In contrast to the prior art however, the control pressure membrane 12 is not mounted merely between the upper pressure chamber 10 and the lower pressure chamber 11, but the control pressure membrane 12 is enclosed in the lower region by a membrane disc 13 and on the top side by a plate 14. Furthermore, the control pressure membrane 12 in the outer region is fixedly connected to the housing of the control chamber 31, and therefore can only change its curvature (because of pressure changes).

In cleaning mode and/or in sterilization mode, the control pressure is selected higher than the primary pressure, so that as a result, the control pressure membrane 12 hits against its lower movement stop 15 and there comes into contact with a sealing device 16 accommodated inside the control chamber 21, in particular a flat seal. In general, it is conceivable that the control pressure membrane 12 only comes into contact with the sealing device in cleaning mode.

The contact with the sealing device 16 prevents the sterilization medium, i.e. the blowing air carrying hydrogen peroxide, from reaching as far as the control pressure membrane 12. To this extent, contacting of the sterilization medium with the control pressure membrane 12 is prevented particularly effectively and easily. No chemical attack on the control membrane, with corresponding consequences such as leaks, blistering or cracking, can therefore occur.

FIG. 3 shows a diagrammatic section view of an exemplary embodiment of a regulator piston 6 described here, on which a pressure plate 8 is arranged, wherein the pressure plate 8 is held by a plate seal 7 at the edges.

In particular, it can be seen that the protruding edge 19 of sealing collar 17 arranged separately from the rest of the control piston 6, presses the plate seal 7 against the regulator piston 6 from above, i.e. on the same side as the pressure plate 8, so that the plate seal 7 is mounted fixedly on the regulator piston 6 but can always be released by detaching the sealing collar 17 from the regulator piston 6. It is also evident that the sealing collar 17 in FIG. 3 has the form of a union nut, which for example can particularly easily and simply be screwed from above onto the plate seal 7 or otherwise be releasably attached. To replace the plate seal 7, if for example this becomes faulty, therefore only the union nut 17 need be removed from the regulator piston 6, so that then only the plate seal 7 need be removed from the regulator piston, insofar as the pressure plate 8 has previously also been removed from the regulator piston 6.

FIG. 4 shows in a diagrammatic section view an alternative to the exemplary embodiment in FIG. 3, wherein instead of a plate seal 7 formed as a ring segment, the plate seal 7 has the form of an O-ring. It has been found that seals with particularly small surface area, in particular seals which are formed as O-rings, can be adjusted particularly easily with the principle outlined above of simply "placing" the sealing collar 17 over the plate seal.

FIG. 5 shows in a diagrammatic top view a device 2000 for forming plastic preforms 30 into plastic containers 40, with which a method 3000 for forming plastic preforms into plastic containers can be carried out. It is clear that a pressure regulator device 100 as outlined above can be assigned to each forming station 60 and be in fluidic contact therewith. It is also conceivable that a pressure regulator device can be assigned to one or more forming devices 60 or vice versa. In any case, the entire process may take place inside one or more sterile rooms, so that the pressure regulator device 100 described herein may also be arranged completely in a sterile room.

The invention is not restricted by the description referring to exemplary embodiments. Rather, the invention comprises all new features and combinations of features, which includes in particular any combination of features in the claims, even if this feature or this combination is not itself explicitly disclosed in the claims or exemplary embodiments.

LIST OF REFERENCE NUMERALS

1 Primary pressure port
2 Secondary pressure port
4 Control means
5 Pressure spring
6 Regulator piston
7 Plate seal/sealing collar
8 Pressure plate
9 Lip
10 Pressure chamber
11 Pressure chamber
12 Control pressure membrane
13 Membrane plate
16 Seal device
18 Seals
19 Protruding seal edge
20 Valve control device/channel
21 Control chamber
30 Plastic preforms
40 Plastic containers
60 Forming devices
100 Regulator chamber
1000 Dome-loaded pressure regulator/pressure regulator device
2000 Forming device
3000 Method Numerous alterations, modifications, and variations of the preferred embodiments disclosed herein will be apparent to those skilled in the art and they are all anticipated and contemplated to be within the spirit and scope of the disclosed specification. For example, although specific embodiments have been described in detail, those with skill in the art will understand that the preceding embodiments and variations can be modified to incorporate various types of substitute and or additional or alternative materials, relative arrangement of elements, order of steps and additional steps, and dimensional configurations. Accordingly, even though only few variations of the method and products are described herein, it is to be understood that the practice of such additional modifications and variations and the equivalents thereof, are within the spirit and scope of the method and products as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A pressure regulator device for regulating a blowing pressure in a stretch-blowmolding machine, comprising:
a regulator chamber, wherein the regulator chamber comprises at least one primary pressure port for introduction of a primary medium into the regulator chamber with a primary pressure, and at least one secondary pressure port for discharging the primary medium from the regulator chamber with a secondary pressure, and within which a regulator piston is mounted displaceably, and wherein
the regulator piston can be moved into an open position and a closed position, depending on a switch position of a valve control device for controlling and/or setting the at least one primary pressure and/or secondary pressure, wherein
the primary medium is conducted from the primary pressure port through the regulator chamber to the at least one secondary pressure port only when the regulator piston is in the open position,
wherein the valve control device comprises a control chamber, and the control chamber comprises at least one control pressure port for introduction of a control medium into the control chamber, and a pressurizable control means is arranged inside the control chamber, wherein the control means is actively connected to the regulator piston such that, on an increase in the secondary pressure of the primary medium above a pressure level of a control pressure of the control medium, the regulator piston transfers from an open to a closed position, and conversely, on a reduction of the secondary pressure below a pressure level of the control pressure, the regulator piston transfers from a closed to an open position, wherein
at least one sealing device is arranged at a lower movement stop inside the control chamber between the secondary pressure port and the control means, wherein a movement of the control means against the lower movement stop is configured to cause the sealing device to reversibly close a fluidic path between the secondary pressure port and the control chamber, such that when the path is closed, the primary medium is fluidically isolated from the control means, independently of the control pressure and/or primary pressure.

2. The pressure regulator device according to claim 1, wherein the stretch-blowmolding machine, and hence also the pressure regulator device, are arranged inside a clean room.

3. The pressure regulator device according to claim 1, wherein the pressurizable control means is configured in the form of a control pressure membrane which divides the control chamber into two pressure chambers and separates these fluidically from each other.

4. The pressure regulator device according to claim 1, wherein in at least one operating state, the primary medium is blowing air for expanding plastic preforms into plastic containers during a working mode.

5. The pressure regulator device according to claim 1, wherein in at least one further operating state, the primary medium is a gaseous sterilization medium which, in a cleaning mode, is conducted from the primary pressure port through the regulator chamber and out of the regulator chamber again via the secondary pressure port.

6. The pressure regulator device according to claim 1, wherein during a cleaning mode, the primary pressure is less than or equal to the control pressure.

7. The pressure regulator device according to claim 1, wherein a pressure plate is arranged at the regulator piston, wherein the pressure plate comprises a plate seal and, in the closed position of the regulator piston, the plate seal closes the regulator chamber fluid-tight against the secondary pressure port.

8. The pressure regulator device according to claim 7, wherein the plate seal is attached releasably to the pressure plate and/or the regulator piston with a sealing collar which can be detached from the pressure plate and/or the regulator piston.

9. The pressure regulator device according to claim 8, wherein the sealing collar is configured in the form of a union nut.

10. The pressure regulator device according to claim 7, wherein the plate seal is configured in the form of a sealing washer or an O-ring.

11. A device for forming plastic preforms into plastic containers comprising:
a movable carrier, on which a plurality of forming stations is arranged for forming the plastic preforms into plastic containers, wherein at least one pressure regulator device is configured and provided for pressurizing the plastic preforms with a blowing pressure of a primary medium in order to expand the plastic preforms into plastic containers, wherein the pressure regulator device further comprises:
a regulator chamber, wherein the regulator chamber comprises at least one primary pressure port for introduction of a primary medium into the regulator chamber with a primary pressure, and at least one secondary pressure port for discharging the primary medium from the regulator chamber with a secondary pressure, and within which a regulator piston is mounted displaceably, and wherein
the regulator piston can be moved into an open position and a closed position, depending on a switch position of a valve control device for controlling and/or setting the at least one primary pressure and/or secondary pressure, wherein
the primary medium is conducted from the primary pressure port through the regulator chamber to the at least one secondary pressure port only when the regulator piston is in the open position,
wherein the valve control device comprises a control chamber, and the control chamber comprises at least one control pressure port for introduction of a control medium into the control chamber, and a pressurizable control means is arranged inside the control chamber, wherein the control means is actively connected to the regulator piston such that, on an increase in the secondary pressure of the primary medium above a pressure level of a control pressure of the control medium, the regulator piston transfers from an open to a closed position, and conversely, on a reduction of the secondary pressure below a pressure level of the control pressure, the regulator piston transfers from a closed to an open position, wherein
at least one sealing device is arranged at a lower movement stop inside the control chamber between the secondary pressure port and the control means, wherein a movement of the control means against the lower movement stop is configured to cause the sealing device to reversibly close a fluidic path between the secondary pressure port and the control chamber, such that when the path is closed, the primary medium is fluidically isolated from the control means, independently of the control pressure and/or primary pressure.

12. A method for forming plastic preforms into plastic containers, comprising:
a movable carrier, on which a plurality of forming stations is arranged for forming the plastic preforms into plastic containers, wherein at least one pressure regulator device pressurizes the plastic preforms with a blowing pressure of a primary medium in order to expand the plastic preforms into plastic containers, wherein the pressure regulator device further comprises:
a regulator chamber, wherein the regulator chamber comprises at least one primary pressure port for introduction of a primary medium into the regulator chamber with a primary pressure, and at least one secondary pressure port for discharging the primary medium from the regulator chamber with a secondary pressure, and within which a regulator piston is mounted displaceably, and wherein
the regulator piston can be moved into an open position and a closed position, depending on a switch position of a valve control device for controlling and/or setting the at least one primary pressure and/or secondary pressure, wherein
the primary medium is conducted from the primary pressure port through the regulator chamber to the at least one secondary pressure port only when the regulator piston is in the open position,
wherein the valve control device comprises a control chamber, and the control chamber comprises at least one control pressure port for introduction of a control medium into the control chamber, and a pressurizable control means is arranged inside the control chamber, wherein the control means is actively connected to the regulator piston such that, on an increase in the secondary pressure of the primary medium above a pressure level of a control pressure of the control medium, the regulator piston transfers from an open to a closed position, and conversely, on a reduction of the secondary pressure below a pressure level of the control pressure, the regulator piston transfers from a closed to an open position, wherein
at least one sealing device is arranged at a lower movement stop inside the control chamber between the secondary pressure port and the control means, wherein a movement of the control means against the lower movement stop is configured to cause the sealing device to reversibly close a fluidic path between the secondary pressure port and the control chamber, such that when the path is closed, the primary medium is fluidically isolated from the control means, independently of the control pressure and/or primary pressure.

* * * * *